(12) United States Patent
Takasuka et al.

(10) Patent No.: US 10,139,491 B2
(45) Date of Patent: Nov. 27, 2018

(54) VEHICLE-MOUNTED DEVICE AND VEHICLE-MOUNTED RANGING SYSTEM

(71) Applicant: DENSO CORPORATION, Kariya, Aichi-pref. (JP)

(72) Inventors: Naohito Takasuka, Nishio (JP); Junichiro Funabashi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 602 days.

(21) Appl. No.: 14/843,331

(22) Filed: Sep. 2, 2015

(65) Prior Publication Data
US 2016/0069998 A1 Mar. 10, 2016

(30) Foreign Application Priority Data

Sep. 4, 2014 (JP) .................................. 2014-180407

(51) Int. Cl.
G01C 3/08 (2006.01)
G01S 17/10 (2006.01)
G01S 7/48 (2006.01)
G01S 7/487 (2006.01)

(52) U.S. Cl.
CPC .......... G01S 17/102 (2013.01); G01S 7/4804 (2013.01); G01S 7/487 (2013.01)

(58) Field of Classification Search
CPC combination set(s) only.
See application file for complete search history.

(56) References Cited

U.S. PATENT DOCUMENTS

| 2008/0106458 | A1 | 5/2008 | Honda et al. |
| 2009/0278727 | A1 | 11/2009 | Inaba |
| 2012/0323474 | A1* | 12/2012 | Breed ................... B60W 30/04 701/117 |

FOREIGN PATENT DOCUMENTS

| JP | H9-159764 A | 6/1997 |
| JP | 2001-194457 | 7/2001 |

* cited by examiner

*Primary Examiner* — Samantha K Abraham
(74) *Attorney, Agent, or Firm* — Knobbe, Martens, Olson & Bear, LLP

(57) ABSTRACT

A vehicle-mounted device includes an interference determination unit and a sensor control unit. The interference determination unit determines whether an interference state where a first electromagnetic wave ranging sensor equipped to a first vehicle may receive a second transmission wave transmitted from a second electromagnetic wave sensor equipped to a second vehicle is present, based on transmission time frame information received by a first wireless communication device equipped to the first vehicle, and reception duration information indicating a reception duration during which a first electromagnetic wave ranging sensor equipped to the first vehicle may receive a first reflected wave. The sensor control unit controls transmission timing for transmitting the first transmission wave from the first electromagnetic wave ranging sensor and a reception duration, and changes the transmission timing and the reception duration to avoid the interference state, when the interference determination unit determines that the interference state is present.

6 Claims, 9 Drawing Sheets

VEHICLE-MOUNTED DEVICE AND VEHICLE-MOUNTED RANGING SYSTEM

CROSS REFERENCE TO RELATED APPLICATION

This application is based on Japanese Patent Application No. 2014-180407 filed on Sep. 4, 2014, the disclosure of which is incorporated herein by reference.

TECHNICAL FIELD

The present disclosure relates to a vehicle-mounted device which is mounted on a vehicle including an electromagnetic wave ranging sensor for measuring a distance to an object by transmitting an electromagnetic wave and controls the electromagnetic wave ranging sensor and a vehicle-mounted ranging system including the electromagnetic wave ranging sensor and the vehicle-mounted device.

BACKGROUND

There is known, as a device for measuring the distance between a host vehicle and the preceding vehicle, a device that emits laser light ahead of the host vehicle and receives reflected laser light produced when the laser light is reflected off the preceding vehicle. This device is called a laser radar as described in JP H09-159764 A (hereinafter referred to as Patent Document 1), or occasionally called as an optical ranging sensor. Hereinafter, the laser light emitted by the laser radar is referred to as irradiation light.

In Patent Document 1, a plurality of vehicles have laser radars mounted on the front and rear ends thereof. In the case where one of two vehicles having the laser radars mounted thereon is the preceding vehicle and the other is the following vehicle running just behind the vehicle, irradiation light emitted by the laser radar mounted on the front end of the following vehicle is reflected off the preceding vehicle, so that reflected light occurs. The reflected light is received by the laser radar mounted on the front end of the following vehicle. In addition, irradiation light emitted from the rear end of the preceding vehicle is received by the laser radar mounted on the front end of the following vehicle.

If the irradiation light emitted from the preceding vehicle is received by the laser radar mounted on the front end of the following vehicle and a distance to the object is measured with the irradiation light misrecognized as the reflected light, an incorrect distance measurement result is outputted.

Accordingly, in Patent Document 1, if the preceding vehicle and the following vehicle have a positional relationship where one vehicle receives the irradiation light from the other vehicle, the one vehicle emits the irradiation light and receives the reflected light during no emission of the irradiation light from the laser radar of the other vehicle. It is determined, based on the number of laser lights received after the emission of the irradiation light, whether the vehicles have the positional relationship where one vehicle receives the irradiation light from the other vehicle. In the case of receiving a plurality of laser lights after emitting only one irradiation light, it is determined that the vehicles have the positional relationship where one vehicle receives the irradiation light from the other vehicle.

SUMMARY

In the case of mutually oncoming vehicles as well, one vehicle might receive the irradiation light from the other vehicle. Further, in the case of mutually oncoming vehicles, the host vehicle might not receive the reflected light but receive the irradiation light emitted by the oncoming vehicle, for example in the case where the vehicles are running around a curve in lanes so that the direction of the host vehicle differs from that of the oncoming vehicle, and there is no preceding vehicle ahead of the host vehicle.

In the case where there is no preceding vehicle, the irradiation light emitted ahead of the host vehicle does not produce the reflected light. Further, since the direction of the host vehicle differs from that of the oncoming vehicle, the irradiation light emitted ahead of the host vehicle might not irradiate the oncoming vehicle, but the irradiation light emitted by the oncoming vehicle might irradiate the host vehicle. In this case, the laser light received after the host vehicle emits the irradiation light is only the irradiation light emitted by the oncoming vehicle. As a result, the irradiation light emitted by the oncoming vehicle might be misrecognized as the reflected light in the measurement of a distance to an object.

Further, such a drawback occurs not only in the optical ranging sensor which emits laser light but also in a radio wave ranging sensor which transmits a radio wave such as a millimeter wave and receives a reflected wave produced when the radio wave is reflected off an object. That is, such a drawback occurs in an electromagnetic wave ranging sensor.

It is an object of the present disclosure to provide a vehicle-mounted device that can restrict, in the measurement of a distance, a transmission wave transmitted from another vehicle from being misrecognized as a reflected wave and a vehicle-mounted ranging system having the vehicle-mounted device.

According to an aspect of the present disclosure, a vehicle-mounted device is mounted on a first vehicle including a first electromagnetic wave ranging sensor that successively transmits a first transmission wave as an electromagnetic wave, receives a first reflected wave produced when the first transmission wave is reflected off an object, and measures a distance to the object based on information of the first transmission wave and the first reflected wave. The first vehicle includes a first wireless communication device that receives transmission time frame information indicating a time frame when a second electromagnetic wave ranging sensor that is a ranging sensor mounted on a second vehicle and transmits a second transmission wave that can be received by the first electromagnetic wave ranging sensor transmits the second transmission wave, by wireless communication with a second wireless communication device mounted on the second vehicle.

The vehicle-mounted device includes: an interference determination unit that determines whether or not an interference state where the first electromagnetic wave ranging sensor may receive the second transmission wave is present, based on the transmission time frame information received by the first wireless communication device and reception duration information indicating a reception duration during which the first electromagnetic wave ranging sensor may receive the first reflected wave; and a sensor control unit that controls a transmission timing for transmitting the first transmission wave from the first electromagnetic wave ranging sensor and the reception duration, and changes the transmission timing and the reception duration so as to avoid the interference state, when the interference determination unit determines that the interference state is present.

According to an aspect of the present disclosure, a vehicle-mounted ranging system includes the vehicle-mounted device, the first electromagnetic wave ranging sensor, and the first wireless communication device.

The first vehicle includes the first wireless communication device, and the first wireless communication device receives the transmission time frame information indicating the time frame when the second electromagnetic wave ranging sensor transmits the second transmission wave. Based on the transmission time frame information, it is determined whether or not an interference state where the first electromagnetic wave ranging sensor might receive the second transmission wave is present. Whether the interference state is present is determined based on the transmission time frame information received by the first wireless communication device and the reception duration information of the first electromagnetic wave ranging sensor included in the first vehicle.

Since it is determined whether or not the interference state is present, using the information received by the first wireless communication device, even if the first vehicle and the second vehicle are mutually oncoming vehicles, it can be determined whether or not the interference state is present. Further, since when it is determined that the interference state is present, the transmission timing and the reception duration are changed so as to avoid the interference state, it is possible to reduce, in the measurement of the distance to the object, the second transmission wave from being misrecognized as the first reflected wave.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

First Embodiment

Figure 1:
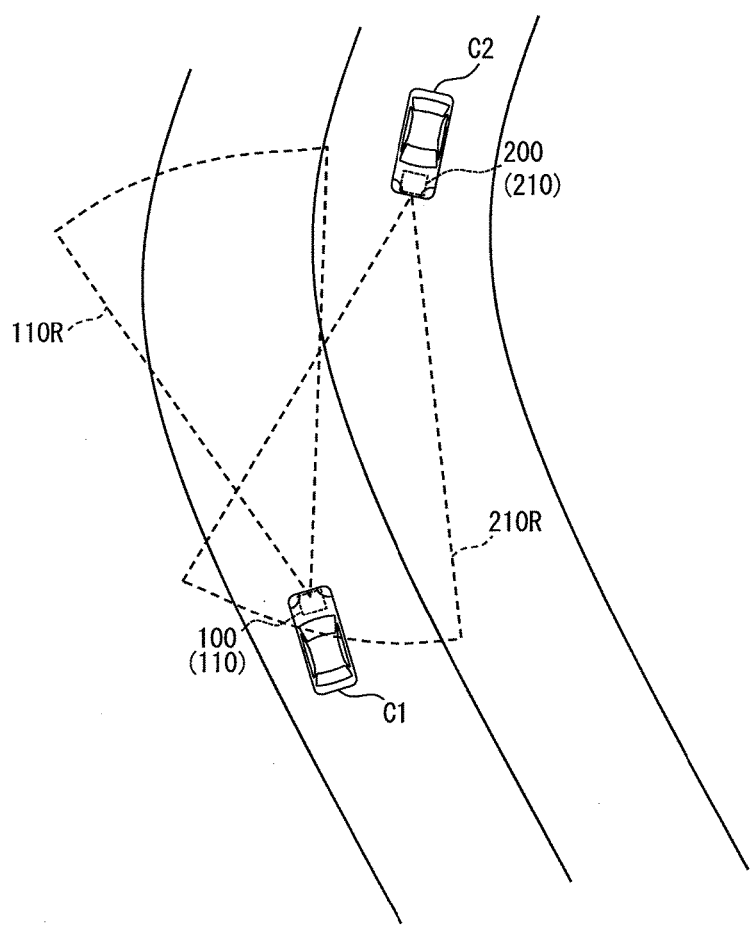
FIG. 1 is a diagram for explaining a situation where a laser radar mismeasures a distance to an object.

Hereinafter, the first embodiment of the present disclosure will be described with reference to drawings. A first vehicle C1 shown in FIG. 1 is equipped with a first vehicle-mounted ranging system 100 as a vehicle-mounted ranging system according to an embodiment of the present disclosure, and a second vehicle C2 is also equipped with a second vehicle-mounted ranging system 200 as the vehicle-mounted ranging system according to the embodiment of the present disclosure. In FIG. 1, the first vehicle C1 and the second vehicle C2 are running around a curve in mutually opposite lanes and traveling in mutually approaching directions.

(Configuration of Vehicle-Mounted Ranging Systems 100, 200)

Figure 2:
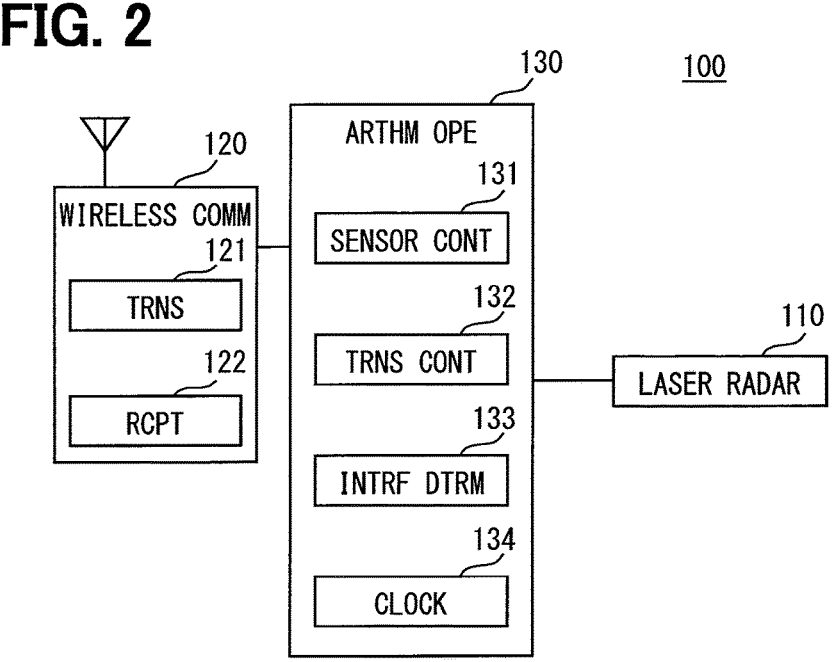
FIG. 2 is a block diagram of a first vehicle-mounted ranging system according to a first embodiment.
Figure 3:
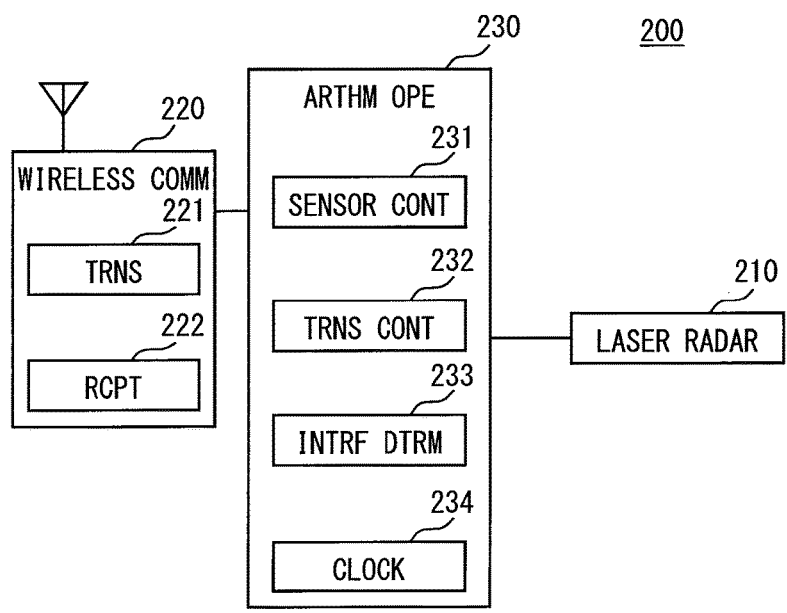
FIG. 3 is a block diagram of a second vehicle-mounted ranging system according to the first embodiment.

The first vehicle-mounted ranging system 100 includes a laser radar 110, a wireless communication device 120, and an arithmetic operation device 130, as shown in FIG. 2. The second vehicle-mounted ranging system 200 has the same configuration as the first vehicle-mounted ranging system 100, and includes a laser radar 210, a wireless communication device 220, and an arithmetic operation device 230, as shown in FIG. 3.

Since the first vehicle-mounted ranging system 100 and the second vehicle-mounted ranging system 200 have the same configuration, only the components of the first vehicle-mounted ranging system 100 will be described below. In the configuration of the second vehicle-mounted ranging system 200, "second" is substituted for "first" in the following description.

The laser radar 110 is a first electromagnetic wave ranging sensor. The laser radar 110 is disposed at the front end of the body of the first vehicle C1 or at the front end of the interior of the first vehicle C1.

Figure 4:
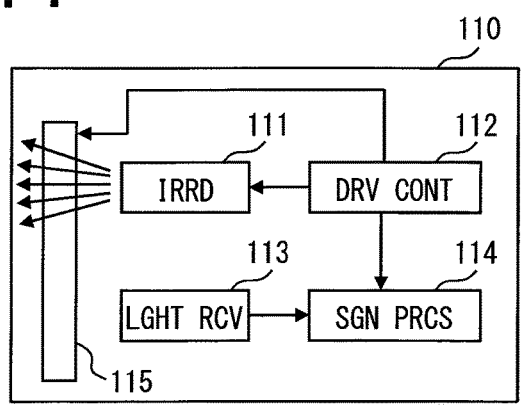
FIG. 4 is a block diagram of the laser radar shown in FIG. 2.

The laser radar 110 includes an irradiation unit 111, a drive control unit 112, a light receiving unit 113, a signal processing unit 114, and an electronic shutter (hereinafter simply referred to as a shutter) 115, as shown in FIG. 4.

The irradiation unit 111 includes a configuration for emitting pulsed laser light over a predetermined irradiation angular range. This configuration includes, for example, a laser diode for emitting laser light and a collimate lens through which the laser light passes. The collimate lens expands the laser light emitted by the laser diode to the irradiation angular range. Hereinafter, the laser light emitted by the laser radar 110 is referred to as first irradiation light. The first irradiation light corresponds to a first transmission wave.

The drive control unit 112 outputs to the irradiation unit 111 a drive signal for causing the laser diode of the irradiation unit 111 to emit light. The drive signal is outputted with timing determined by a light transmission/reception pattern specified by a sensor control unit 131 described later. The light transmission/reception pattern determines irradiation timing for emitting the first irradiation light, and the irradiation timing corresponds to transmission timing.

Further, the drive control unit 112 controls the opening and closing of the shutter 115. The drive control unit 112 outputs to the shutter 115 an opening instruction signal at the time of opening the shutter 115 and a closing instruction signal at the time of closing the shutter 115.

The opening instruction signal is outputted with such timing (time point) that the shutter 115 is open when the first irradiation light is emitted from the irradiation unit 111. For example, the opening instruction signal is outputted immediately before the drive signal.

During a light transmission/reception duration from when the opening instruction signal is outputted, the shutter 115 is opened, and the first irradiation light is emitted till when the closing instruction signal is outputted and the shutter 115 is closed, the light receiving unit 113 can receive first reflected light. The length of the light transmission/reception duration is predetermined, and is, e.g., about a few hundred to 500 ns. In the light transmission/reception duration, the duration of emission of the first irradiation light, that is, the pulse width of the first irradiation light is, for example, 1 ns. The light transmission/reception duration corresponds to a reception duration.

The light receiving unit 113 includes a configuration for receiving reflected light produced when the first irradiation light is reflected off an external object, that is, the first reflected light. This configuration includes, for example, a condensing lens and a plurality of light receiving elements. The first reflected light is guided through the condensing lens to different light receiving elements depending on the arrival direction of the first reflected light. Therefore, by outputting a signal indicating which light receiving element receives the first reflected light, the existence direction of the object can be obtained. The first reflected light corresponds to a first reflected wave.

The signal processing unit 114 performs processing for calculating a distance to the object by multiplying the speed of light by one-half of the time difference between when the irradiation unit 111 emits the first irradiation light and when the light receiving unit 113 receives the first reflected light. The time when the drive control unit 112 outputs the drive signal is used as the time when the irradiation unit 111 emits the first irradiation light.

The electronic shutter (hereinafter simply referred to as the shutter) 115 is disposed in the irradiation direction of the first irradiation light with respect to the irradiation unit 111 and disposed in the arrival direction of the first reflected light with respect to the light receiving unit 113. As described above, the shutter 115 is controlled by the drive control unit 112, opened in accordance with the emission of the first irradiation light, and closed after a lapse of the light transmission/reception duration.

The laser radar 210 having the same configuration as the laser radar 110 corresponds to a second electromagnetic wave ranging sensor, and irradiation light emitted by the laser radar 210 is referred to as second irradiation light. The second irradiation light corresponds to a second transmission wave.

Referring back to FIG. 2, the wireless communication device 120 is a communication device capable of vehicle-to-vehicle communication, and includes a transmission unit 121 and a reception unit 122. The wireless communication device 120 operates at a band of frequencies of e.g. 5.8-5.9 GHz or 700 MHz and at a communication distance of several hundred meters. The communication is performed, for example, by broadcast, but may be performed by unicast or multicast. The wireless communication device 120 corresponds to a first wireless communication device, and the wireless communication device 220 included in the second vehicle-mounted ranging system 200 corresponds to a second wireless communication device.

The arithmetic operation device 130 corresponds to a vehicle-mounted device, and is connected to the laser radar 110 and the wireless communication device 120. The arithmetic operation device 130 is a computer including a CPU, a ROM, a RAM, and the like. When the CPU executes a program stored in the ROM while utilizing the temporary storage function of the RAM, the arithmetic operation device 130 functions as a sensor control unit 131, a transmission control unit 132, and an interference determination unit 133. Further, the arithmetic operation device 130 includes a clock 134. The clock 134 is not used in the first embodiment, but is used in the second embodiment. Some or all of the functions executed by the arithmetic operation device 130 may be configured by hardware such as one or a plurality of ICs.

(Functions of Arithmetic Operation Device 130)

The sensor control unit 131 outputs the light transmission/reception pattern which is a pattern for determining the light transmission/reception duration of the laser radar 110 to the drive control unit 112 of the laser radar 110. In this embodiment, the light transmission/reception pattern is determined using a pseudorandom number. For example, an M-sequence generated by a linear feedback shift register is used as the pseudorandom number. As a matter of course, the pseudorandom number is not limited to the M-sequence, and may be one other than the M-sequence.

The reason why the light transmission/reception pattern is determined using the pseudorandom number is to avoid interference by the second irradiation light emitted by the laser radar 210 mounted on the second vehicle C2 as another vehicle.

The laser radar 110 emits the first irradiation light over the predetermined angular range ahead of the first vehicle C1. Further, the second vehicle-mounted ranging system 200 has the same configuration as the first vehicle-mounted ranging system 100, and the laser radar 210 included in the second vehicle-mounted ranging system 200 emits the second irradiation light over the predetermined angular range ahead of the second vehicle C2.

As shown in FIG. 1, a detection range 110R in which the laser radar 110 included in the first vehicle-mounted ranging system 100 can detect the object exceeds, in the vehicle width direction, the lane where the first vehicle C1 is running. A detection range 210R of the laser radar 210 included in the second vehicle-mounted ranging system 200 having the same configuration as the first vehicle-mounted ranging system 100 also exceeds, in the vehicle width direction, the lane where the second vehicle C2 is running.

In the positional relationship shown in FIG. 1, the first vehicle C1 is within the detection range 210R. Accordingly, the second irradiation light emitted by the laser radar 210 included in the second vehicle-mounted ranging system 200 is received by the laser radar 110 included in the first vehicle-mounted ranging system 100. If the second irradiation light is received by the laser radar 110, the second irradiation light is misrecognized as the first reflected light, which causes a miscalculation of the distance to the object.

The light transmission/reception duration is a fixed duration starting from the emission of the first irradiation light. If the second irradiation light is not emitted during this fixed duration, the second irradiation light is not received by the laser radar 110. If the light transmission/reception duration of the laser radars 110 and 210 is repeated with a fixed period, the laser radar 110 might repeatedly receive the second irradiation light. On the other hand, a random interval between the light transmission/reception duration and the next light transmission/reception duration can reduce the possibility that the irradiation timing of the second irradiation light and the light transmission/reception duration of the laser radar 110 overlap each other. For this reason, the light transmission/reception pattern is determined using the pseudorandom number.

The light transmission/reception pattern is a sequence of 0s and 1s such as 010010001 . . . . The numeral "1" signifies one light transmission/reception duration, and "0" signifies a pause duration during which laser light is not emitted or received. The length of one pause duration is the same as the light transmission/reception duration. During the pause duration, the shutter 115 is closed.

The transmission control unit 132 successively transmits the light transmission/reception pattern of the host vehicle's system, that is, the first vehicle-mounted ranging system 100 through the wireless communication device 120 to the outside of the vehicle. The light transmission/reception pattern may be transmitted periodically or after the end of processing shown in FIG. 5. The transmission control unit 232 of the second vehicle-mounted ranging system 200 also transmits the light transmission/reception pattern of the second vehicle-mounted ranging system 200 to the outside. The light transmission/reception pattern transmitted by the second vehicle-mounted ranging system 200 corresponds to transmission pattern information and transmission time frame information.

If the second vehicle C2 and the first vehicle C1 are within the communication areas of the wireless communication devices 120 and 220 respectively, the light transmission/reception pattern transmitted from the second vehicle C2 is received by the reception unit 122 of the wireless communication device 120 mounted on the first vehicle C1.

The interference determination unit 133 determines whether or not an interference state where the laser radar 110 may receive the second irradiation light is present. More specifically, the light transmission/reception pattern received by the reception unit 122 is compared with the light transmission/reception pattern being used by the host vehicle's system, that is, the first vehicle-mounted ranging system 100. If there is at least one overlap between the light transmission/reception durations, it is determined that the interference state is present. The light transmission/reception pattern being used by the first vehicle-mounted ranging system 100 corresponds to reception duration information. In this comparison, the received light transmission/reception pattern is compared with the light transmission/reception pattern used from next time by the host vehicle's system.

If the interference determination unit 133 determines that the interference state is present, the light transmission/reception pattern used from next time by the host vehicle's system is changed so that the light transmission/reception duration in the light transmission/reception pattern used from next time by the host vehicle's system does not overlap with the light transmission/reception duration in the received light transmission/reception pattern.

For example, in the following example of the received light transmission/reception pattern and the light transmission/reception pattern used from next time by the host vehicle's system, there is an overlap between light transmission/reception durations indicated by the second "1".

Received light transmission/reception pattern:
010010001 . . .
Light transmission/reception pattern used from next time by the host vehicle's system:
001010010 . . .

In this case, in the light transmission/reception pattern used from next time by the host vehicle's system, the second "1" is shifted to change the light transmission/reception pattern such as shown by the "changed light transmission/reception pattern".

Changed light transmission/reception pattern:
001001010 . . .

Alternatively, unlike the above example, the whole of the light transmission/reception pattern may be changed using a new pseudorandom number.

Figure 5:
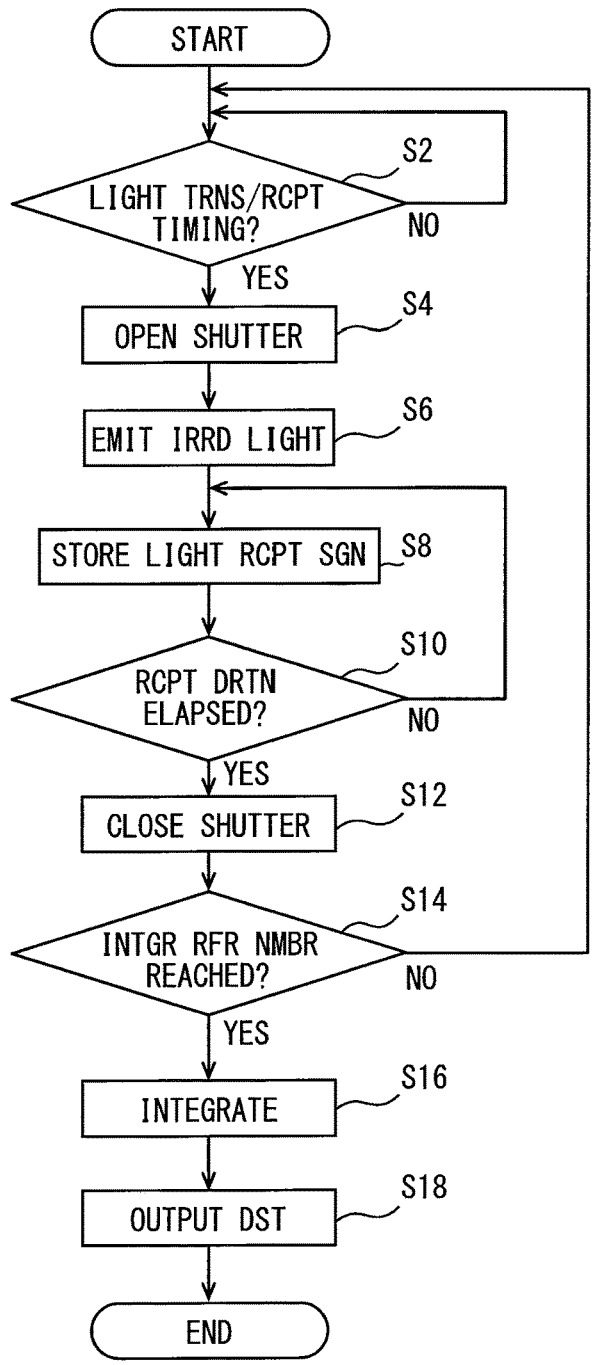
FIG. 5 is a flowchart showing ranging processing executed by the laser radar.

With reference to FIG. 5, processing by the drive control unit 112 and the signal processing unit 114 in the laser radar 110 will be more specifically described. In the processing shown in FIG. 5, S2 to S6, S10 and S12 are performed by the drive control unit 112, and the others are performed by the signal processing unit 114. The processing shown in FIG. 5 is repeatedly executed in a state where the first vehicle C1 satisfies an execution condition such as when the shift position of the first vehicle C1 is a forward position.

In S2, it is determined whether or not light transmission/reception timing has arrived, based on whether or not the pause duration corresponding to the number of 0s between "1" corresponding to the previous light transmission/reception duration and "1" corresponding to the next light transmission/reception duration in the light transmission/reception pattern has elapsed after the end of the previous light transmission/reception duration.

If it is determined that the light transmission/reception timing has not arrived (S2: NO), the determination in S2 is repeated. If it is determined that the light transmission/reception timing has arrived (S2: YES), the flow proceeds to S4.

In S4, to open the shutter 115, the opening instruction signal is outputted to the shutter 115. In S6, to cause the irradiation unit 111 to emit the first irradiation light, the drive signal is outputted to the irradiation unit 111.

In S8, light reception signals outputted from the light receiving elements of the light receiving unit 113 are stored. In S10, it is determined whether or not the light transmission/reception duration has elapsed. If NO in the determination of S10, the flow returns to S8. If YES in the determination of S10, the flow proceeds to S12.

In S12, to close the shutter 115, the closing instruction signal is outputted to the shutter 115. Then, in S14, it is determined whether or not the number of emissions of the first irradiation light reaches an integration reference number after a previous distance is outputted in S18 described later. The integration reference number is, for example, 100. If NO in the determination of S14, the flow returns to S2. If YES in the determination of S14, the flow proceeds to S16.

In S16, light reception signals of each light receiving element stored in S8 are integrated. In S18, it is determined that there is an object if the strength of the light reception signal integrated in S16 exceeds an object detection threshold, a distance to the object is calculated, and the calculated distance is outputted to the arithmetic operation device 130 or another specified device. The distance to the object is calculated from the time difference between when the irradiation unit 111 emits the first irradiation light and when the light receiving unit 113 receives the first reflected light and the speed of light.

Figure 6:
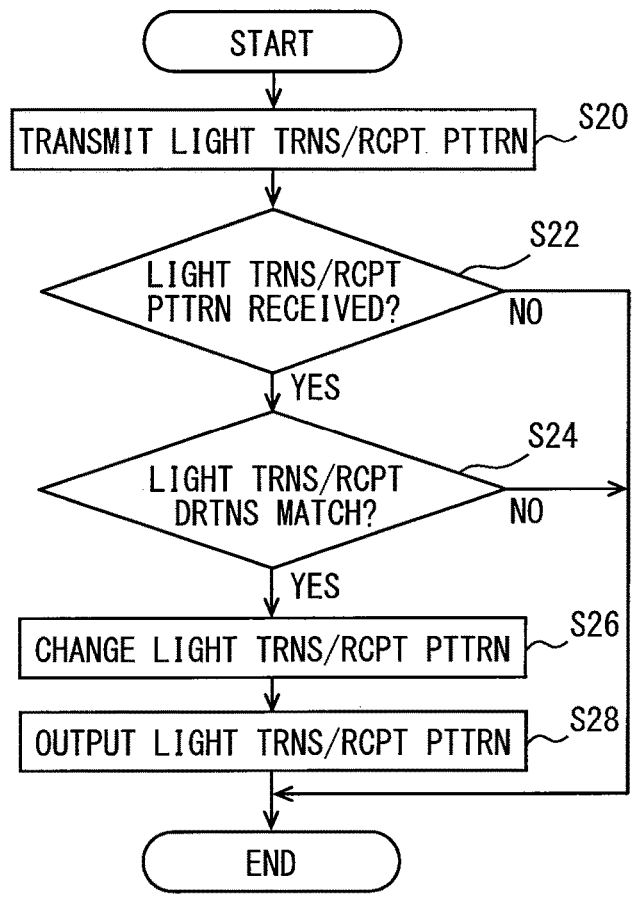
FIG. 6 is a flowchart showing processing executed by an arithmetic operation device in the first embodiment.

FIG. 6 is a flowchart showing processing executed by the arithmetic operation device 130. The arithmetic operation device 130 repeatedly executes the processing shown in FIG. 6. The processing of FIG. 6 can be executed, for example, each time the laser radar 110 ends the processing of FIG. 5. Alternatively, the processing of FIG. 6 may be executed with a fixed period.

In S20 which is performed by the transmission control unit 132, the transmission control unit 132 causes the transmission unit 121 of the wireless communication device 120 to transmit the currently used light transmission/reception pattern.

S22 and S24 are performed by the interference determination unit 133. In S22, it is determined whether or not the reception unit 122 has received the light transmission/reception pattern transmitted from another vehicle, that is, the light transmission/reception pattern transmitted from the second vehicle C2 in this embodiment. If NO in the determination of S22, the processing of FIG. 6 ends. If YES in the determination of S22, the flow proceeds to S24.

In S24, the light transmission/reception pattern being used by the first vehicle-mounted ranging system 100 is compared with the light transmission/reception pattern received by the reception unit 122, and it is determined whether or not light transmission/reception durations match. That is, it is determined whether or not an interference state is present. If NO in the determination of S24, the processing of FIG. 6 ends. If YES in the determination of S24, the flow proceeds to S26.

S26 and S28 are performed by the sensor control unit 131. In S26, the light transmission/reception pattern is changed to avoid the interference state. In S28, the light transmission/reception pattern changed in S26 is outputted to the drive control unit 112 of the laser radar 110. The drive control unit 112 of the laser radar 110 acquires the new light transmission/reception pattern, and performs the processing of FIG. 5, using the acquired new light transmission/reception pattern.

(Advantageous Effect of First Embodiment)

The advantageous effect of the first embodiment will be described. Although description is made by way of example of the first vehicle-mounted ranging system 100 for the sake of convenience, the second vehicle-mounted ranging system 200 can also provide the same advantageous effect. The second vehicle-mounted ranging system 200 mounted on the second vehicle C2 includes the wireless communication device 220, the arithmetic operation device 230, and the laser radar 210. The transmission control unit 232 of the arithmetic operation device 230 causes the wireless communication device 220 to transmit the light transmission/reception pattern of the laser radar 210 (S20).

If the light transmission/reception pattern is received from the second vehicle C2 (S22: YES), the arithmetic operation device 130 of the first vehicle-mounted ranging system 100 determines whether or not light transmission/reception durations match (S24).

It is determined whether or not light transmission/reception durations match, using the information received by the wireless communication device 120. Therefore, even if the first vehicle C1 and the second vehicle C2 are mutually oncoming vehicles, it can be determined whether or not light transmission/reception durations match. If it is determined that light transmission/reception durations match (S24: YES), the light transmission/reception pattern is changed (S26), and the changed light transmission/reception pattern is outputted to the laser radar 110 (S28). Thus, the light transmission/reception pattern of the laser radar 110 is changed, which restricts an overlap between the irradiation timing of the second irradiation light and the light transmission/reception duration of the laser radar 110. Therefore, it is possible to restrict, in the measurement of the distance to the object, the second irradiation light from being misrecognized as the first reflected light.

Second Embodiment

Next, the second embodiment will be described. In the descriptions of the second and subsequent embodiments, components having the same reference numerals as used in the previous embodiments are the same as those having the same reference numerals in the previous embodiments, except where specified otherwise. Further, in the case where only part of a configuration is described, the previously described embodiment is applicable to the other part of the configuration.

The second embodiment differs from the first embodiment in the processing executed by the arithmetic operation device 130. In the first embodiment, the received light transmission/reception pattern is compared with the light transmission/reception pattern of the host vehicle's system, thereby determining whether or not the interference state is present. On the other hand, in the second embodiment, transmission time information is received, and based on the transmission time information and the reception duration information, it is determined whether or not the interference state is present.

Figure 7:
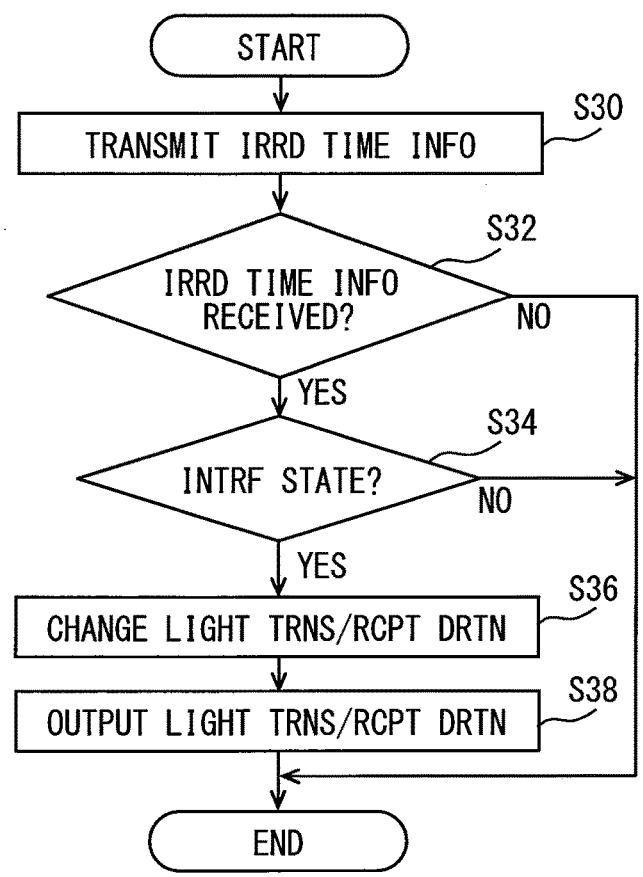
FIG. 7 is a flowchart showing processing executed by the arithmetic operation device in a second embodiment.

FIG. 7 is a flowchart showing processing executed by the arithmetic operation device 130 in the second embodiment. The processing of FIG. 7 is substituted for that of FIG. 6.

In S30 which is performed by the transmission control unit 132, the transmission control unit 132 causes the transmission unit 121 of the wireless communication device 120 to transmit irradiation time information corresponding to transmission time information. The irradiation time information is information indicating the irradiation start times of predetermined number of first irradiation lights. The irradiation start time is determined from the clock 134 and the light transmission/reception pattern acquired from the sensor control unit 131. Further, the irradiation time information may include the irradiation end time of each first irradiation light. Although FIG. 7 illustrates the processing performed by the arithmetic operation device 130 included in the first vehicle-mounted ranging system 100, the arithmetic operation device 230 of the second vehicle-mounted ranging system 200 having the same configuration also executes S30. Therefore, the second vehicle-mounted ranging system 200 also transmits irradiation time information.

S32 and S34 are performed by the interference determination unit 133. In S32, it is determined whether or not the reception unit 122 has received the irradiation time information transmitted from the second vehicle-mounted ranging system 200. If NO in the determination of S32, the processing of FIG. 7 ends. If YES in the determination of S32, the flow proceeds to S34.

In S34, it is determined whether or not an interference state is present. More specifically, a duration during which the second vehicle-mounted ranging system 200 emits the second irradiation light is determined from the irradiation time information received by the reception unit 122. Further, the start time and the end time of the light transmission/reception duration of the laser radar 110 are determined from the light transmission/reception pattern acquired from the sensor control unit 131. Then, it is determined whether or not the light transmission/reception duration of the laser radar 110 includes the duration during which the second vehicle-mounted ranging system 200 emits the second irradiation light. If NO in the determination of S34, the processing of FIG. 7 ends. If YES in the determination of S34, the flow proceeds to S36.

S36 and S38 are performed by the sensor control unit 131. In S36, the light transmission/reception duration of the laser radar 110 is changed to avoid the interference state. For example, the light transmission/reception duration of the laser radar 110 that includes the duration during which the second vehicle-mounted ranging system 200 emits the second irradiation light is changed to the pause duration, and the pause duration immediately after the light transmission/reception duration changed to the pause duration is changed to the light transmission/reception duration.

In S38, a new light transmission/reception pattern reflecting the light transmission/reception duration changed in S36 is outputted to the drive control unit 112 of the laser radar 110. The drive control unit 112 of the laser radar 110 acquires the new light transmission/reception pattern, and performs the processing of FIG. 5, using the acquired new light transmission/reception pattern.

(Advantageous Effect of Second Embodiment)

The second embodiment differs from the first embodiment in the details of the determination of the interference state; however, in the second embodiment, if it is determined that the interference state is present, the light transmission/reception pattern is changed to avoid the interference state, in the same way as in the first embodiment. Therefore, as in the first embodiment, it is possible to restrict, in the measurement of the distance to the object, the second irradiation light from being misrecognized as the first reflected light.

Third Embodiment

Figure 8:
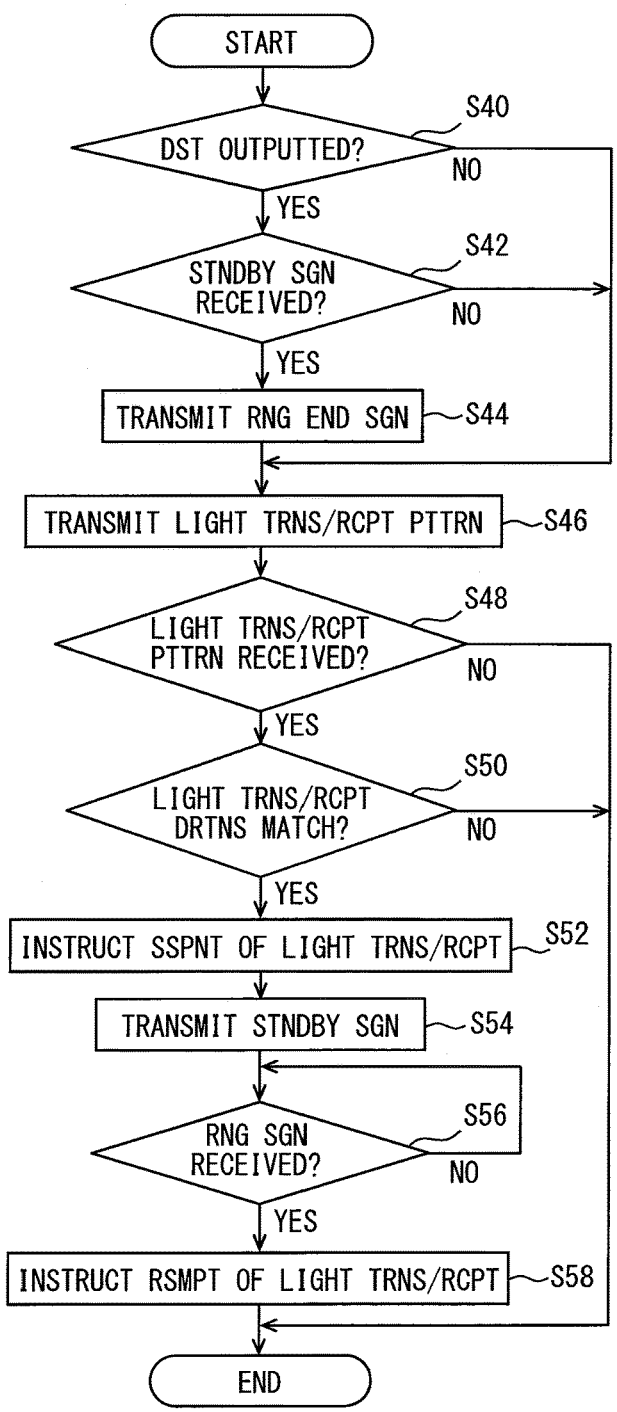
FIG. 8 is a flowchart showing processing executed by the arithmetic operation device in a third embodiment.

In the third embodiment, the arithmetic operation device 130 executes processing shown in FIG. 8. S40 to S44 are performed by the transmission control unit 132. In S40, it is determined whether or not the laser radar 110 has outputted the distance by executing S18. If NO in the determination of S40, the flow proceeds to S46. If YES in the determination of S40, the flow proceeds to S42.

In S42, it is determined whether or not a standby signal has been received. The standby signal is transmitted if it is determined that the interference state is present, and the vehicle-mounted ranging system that has transmitted the standby signal suspends laser light ranging.

Before executing S42, the laser radar 110 outputs the distance, that is, the ranging is ended. Accordingly, in S44, a ranging end signal is transmitted from the transmission unit 121 of the wireless communication device 120. When the vehicle-mounted ranging system that has transmitted the standby signal receives the ranging end signal, the vehicle-mounted ranging system ends the standby state and resumes the light transmission/reception, as described later.

After S44 is executed, or if NO in the determination of S40, S46 is executed. S46 to S50 are the same as S20 to S24 in FIG. 6. In S50, if it is determined that light transmission/reception durations match, that is, if it is determined that the interference state is present, the flow proceeds to S52.

In S52 which is performed by the sensor control unit 131, a signal for instructing the suspension of the light transmission/reception is outputted to the drive control unit 112 of the laser radar 110. Further, in S54, the standby signal is transmitted from the wireless communication device 120. S54 is performed by the transmission control unit 132.

S56 and S58 are performed by the sensor control unit 131. In S56, it is determined whether or not the ranging end signal has been received. If NO in the determination of S56, S56 is repeated. If YES in the determination of S56, the flow proceeds to S58. In S58, the sensor control unit 131 instructs the drive control unit 112 of the laser radar 110 to resume the light transmission/reception. In response to this instruction, the laser radar 110 resumes emitting the first irradiation light and receiving the first reflected light, using the light transmission/reception pattern acquired before the suspension of the light transmission/reception.

(Advantageous Effect of Third Embodiment)

In the third embodiment, if it is determined that the interference state is present (S50: YES), the light transmission/reception is suspended (S52), the standby signal is transmitted from the wireless communication device 120 (S54), and the light transmission/reception is not resumed until the ranging end signal is received (S56, S58). In this way as well, it is possible to restrict, in the measurement of the distance to the object, the second irradiation light from being misrecognized as the first reflected light.

Fourth Embodiment

Figure 9:
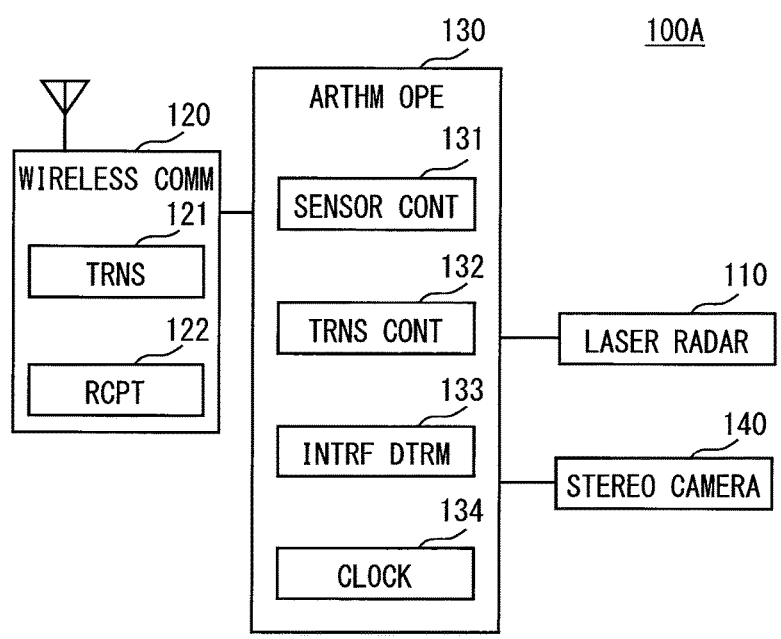
FIG. 9 is a block diagram of a first vehicle-mounted ranging system according to a fourth embodiment.

A first vehicle-mounted ranging system 100A according to the fourth embodiment includes a stereo camera 140 as shown in FIG. 9. The other hardware configuration is the same as that of the first vehicle-mounted ranging system 100 according to the first embodiment.

The stereo camera 140 takes images ahead of the first vehicle C1, and has a function of measuring a distance to an object existing ahead of the first vehicle C1 by analyzing a taken image. The stereo camera 140 does not sense laser light but senses visible light to measure the distance to the object. Therefore, even if the stereo camera 140 receives laser light, the distance measurement result does not change. The stereo camera 140 corresponds to a different-method ranging sensor. Further, the second vehicle-mounted ranging system 200 may include the stereo camera 140.

Figure 10:
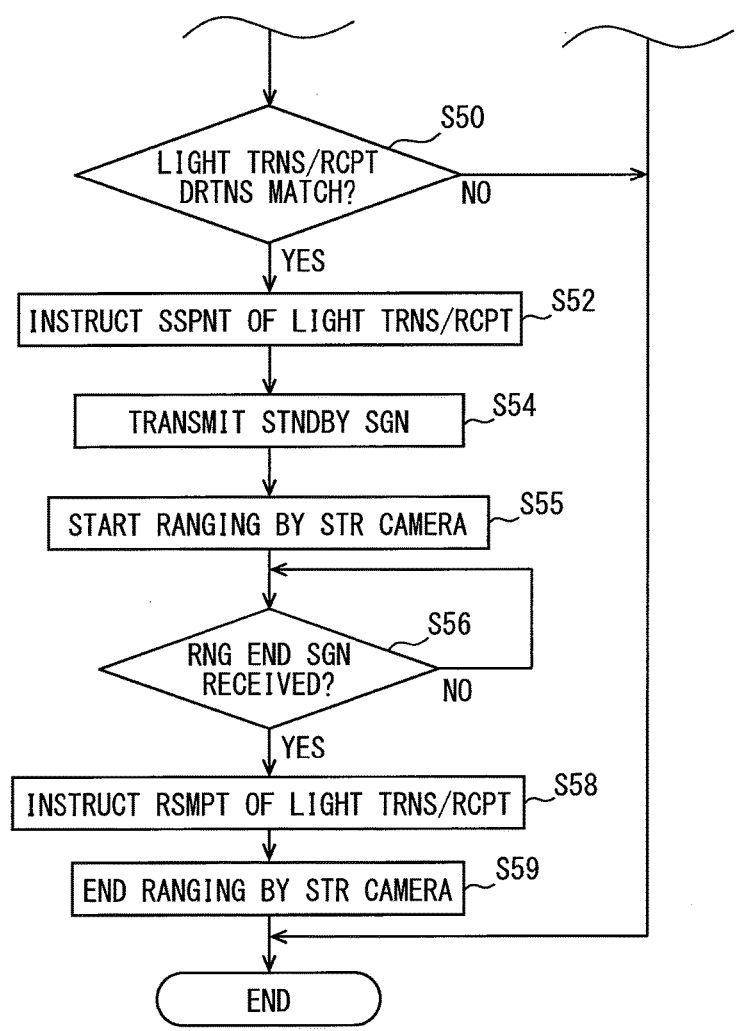
FIG. 10 is a flowchart showing processing executed by the arithmetic operation device in the fourth embodiment.

In the fourth embodiment, the arithmetic operation device 130 executes processing shown in FIG. 10. A portion omitted in FIG. 10 is the same processing in FIG. 8. After the standby signal is transmitted in S54, S55 is executed.

In S55 which is executed by the sensor control unit 131, the sensor control unit 131 causes the stereo camera 140 to start ranging the object ahead. Then, the ranging end signal is received (S56: YES), the laser radar 110 is instructed to resume emitting the first irradiation light and receiving the first reflected light (S58), and the ranging by the stereo camera 140 is ended (S59).

(Advantageous Effect of Fourth Embodiment)

In the fourth embodiment, if it is determined that the interference state is present (S50: YES) and the light transmission/reception by the laser radar 110 is suspended, the stereo camera 140 starts ranging the object (S55). Therefore, in addition to the advantageous effect of the third embodiment, it is possible to measure the distance to the object even during the suspension of the ranging by the laser radar 110.

The embodiments of the present disclosure are described hereinabove. The present disclosure is not limited to the embodiments described hereinabove, but may be modified in various other ways.

First Modification

For example, in the foregoing embodiments, the first irradiation light is pulsed light, and the distance to the object is calculated from the time difference between the time when the first irradiation light is emitted and the time when the first reflected light is received. That is, the time of emission and the time of reception are used as the information of the first irradiation light and the information of the first reflected light. However, the information is not limited thereto, and the distance to the object may be measured by a phase difference measurement method of continuously emitting the first irradiation light whose frequency varies sinusoidally and measuring the distance based on the phase difference between the first irradiation light and the first reflected light. That is, the distance to the object may be measured using the phase as the information of the first irradiation light and the information of the first reflected light.

The phase difference measurement method differs from the foregoing embodiments in that the first irradiation light is constantly emitted during the light transmission/reception duration, but the interference determination method is the same as the foregoing embodiments.

Other Modifications

The processing by the signal processing unit 114 in the foregoing embodiments may be performed by the arithmetic operation device 130 (second modification). By controlling the conduction of the light receiving unit 113 instead of the opening and closing of the shutter 115, the duration during which the light receiving unit 113 can receive the first reflected light may be controlled (third modification). The laser radar 110 may emit the first irradiation light whose width is kept fixed in the form of a line even away from the laser radar 110, and perform scanning with the first irradiation light over the predetermined angular range (fourth modification). A radio wave ranging sensor using a radio wave such as a millimeter wave as a transmission wave and a reception wave may be used in place of the laser radars 110, 210 (fifth modification). Further, in the case where the laser radars 110 and 210 are used as the first and second electromagnetic wave ranging sensors, the radio wave ranging sensor may be used as the different-method ranging sensor (sixth modification). The light transmission/reception pattern may be a pattern in which the light transmission/reception duration is repeated with a fixed period (seventh modification).

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A vehicle-mounted device mounted on a first vehicle, the first vehicle including: a first electromagnetic wave ranging sensor that successively transmits a first transmission wave as an electromagnetic wave, receives a first reflected wave produced when the first transmission wave is reflected off an object, and measures a distance to the object based on information of the first transmission wave and the first reflected wave; and a first wireless communication device that receives transmission time frame information indicating a time frame when a second electromagnetic wave ranging sensor that is a ranging sensor mounted on a second vehicle and transmits a second transmission wave that may be received by the first electromagnetic wave ranging sensor transmits the second transmission wave, by wireless communication with a second wireless communication device mounted on the second vehicle, the vehicle-mounted device comprising:
an interference determination unit that determines whether or not an interference state where the first electromagnetic wave ranging sensor may receive the second transmission wave is present, based on the transmission time frame information received by the first wireless communication device, and reception duration information indicating a reception duration during which the first electromagnetic wave ranging sensor may receive the first reflected wave; and
a sensor control unit that controls transmission timing for transmitting the first transmission wave from the first electromagnetic wave ranging sensor and the reception duration, and changes the transmission timing and the reception duration so as to avoid the interference state, when the interference determination unit determines that the interference state is present, wherein
the first wireless communication device is adapted to receive a ranging end signal indicating an end of distance measurement in which the second electromagnetic wave ranging sensor transmits the second transmission wave, by communication with the second wireless communication device, and
the sensor control unit suspends transmission of the first transmission wave and reception of the first reflected wave, when the interference determination unit determines that the interference state is present, and resumes the transmission of the first transmission wave and the reception of the first reflected wave after the first wireless communication device receives the ranging end signal.

2. The vehicle-mounted device according to claim 1, wherein
the transmission time frame information is transmission pattern information indicating a pattern of an interval to transmit the second transmission wave, and
the interference determination unit uses a pattern of an interval of the reception duration as the reception duration information, and determines whether or not the interference state is present, based on the transmission pattern information and the pattern of the interval of the reception duration.

3. The vehicle-mounted device according to claim 1, wherein
the transmission time frame information is transmission time information indicating a time to transmit the second transmission wave, and
the interference determination unit uses a start time and an end time of the reception duration as the reception duration information, and determines whether or not the interference state is present, based on the transmission pattern information and the start time and the end time of the reception duration.

4. A vehicle-mounted device mounted on a first vehicle, the first vehicle including: a first electromagnetic wave ranging sensor that successively transmits a first transmission wave as an electromagnetic wave, receives a first reflected wave produced when the first transmission wave is reflected off an object, and measures a distance to the object based on information of the first transmission wave and the first reflected wave; and a first wireless communication device that receives transmission time frame information indicating a time frame when a second electromagnetic wave ranging sensor that is a ranging sensor mounted on a second vehicle and transmits a second transmission wave that may be received by the first electromagnetic wave ranging sensor transmits the second transmission wave, by wireless communication with a second wireless communication device mounted on the second vehicle, the vehicle-mounted device comprising:
an interference determination unit that determines whether or not an interference state where the first electromagnetic wave ranging sensor may receive the second transmission wave is present, based on the transmission time frame information received by the first wireless communication device, and reception duration information indicating a reception duration during which the first electromagnetic wave ranging sensor may receive the first reflected wave; and
a sensor control unit that controls transmission timing for transmitting the first transmission wave from the first electromagnetic wave ranging sensor and the reception duration, and changes the transmission timing and the reception duration so as to avoid the interference state, when the interference determination unit determines that the interference state is present, wherein the first vehicle includes a different-method ranging sensor that measures the distance to the object by a different method from the first electromagnetic wave ranging sensor, and the sensor control unit uses the different-method ranging sensor to measure the distance to the object, when the interference determination unit determines that the interference state is present.

5. A vehicle-mounted ranging system to be mounted on a first vehicle, comprising:
  a first electromagnetic wave ranging sensor that successively transmits a first transmission wave as an electromagnetic wave, receives a first reflected wave produced when the first transmission wave is reflected off an object, and measures a distance to the object based on information of the first transmission wave and the first reflected wave;
  a first wireless communication device that receives transmission time frame information indicating a time frame when a second electromagnetic wave ranging sensor that is a ranging sensor mounted on a second vehicle and transmits a second transmission wave that may be received by the first electromagnetic wave ranging sensor transmits the second transmission wave, by wireless communication with a second wireless communication device mounted on the second vehicle; and
  a vehicle-mounted device that includes:
    an interference determination unit that determines whether or not an interference state where the first electromagnetic wave ranging sensor may receive the second transmission wave is present, based on the transmission time frame information received by the first wireless communication device, and reception duration information indicating a reception duration during which the first electromagnetic wave ranging sensor may receive the first reflected wave; and
    a sensor control unit that controls transmission timing for transmitting the first transmission wave from the first electromagnetic wave ranging sensor and the reception duration, and changes the transmission timing and the reception duration so as to avoid the interference state, when the interference determination unit determines that the interference state is present, wherein
  the first wireless communication device is adapted to receive a ranging end signal indicating an end of distance measurement in which the second electromagnetic wave ranging sensor transmits the second transmission wave, by communication with the second wireless communication device, and
  the sensor control unit suspends transmission of the first transmission wave and reception of the first reflected wave, when the interference determination unit determines that the interference state is present, and resumes the transmission of the first transmission wave and the reception of the first reflected wave after the first wireless communication device receives the ranging end signal.

6. The vehicle-mounted ranging system according to claim 5, wherein
  the vehicle-mounted device includes a transmission control unit that causes the first wireless communication device to transmit information indicating a time frame to transmit the first transmission wave.

* * * * *